Patented Nov. 15, 1932

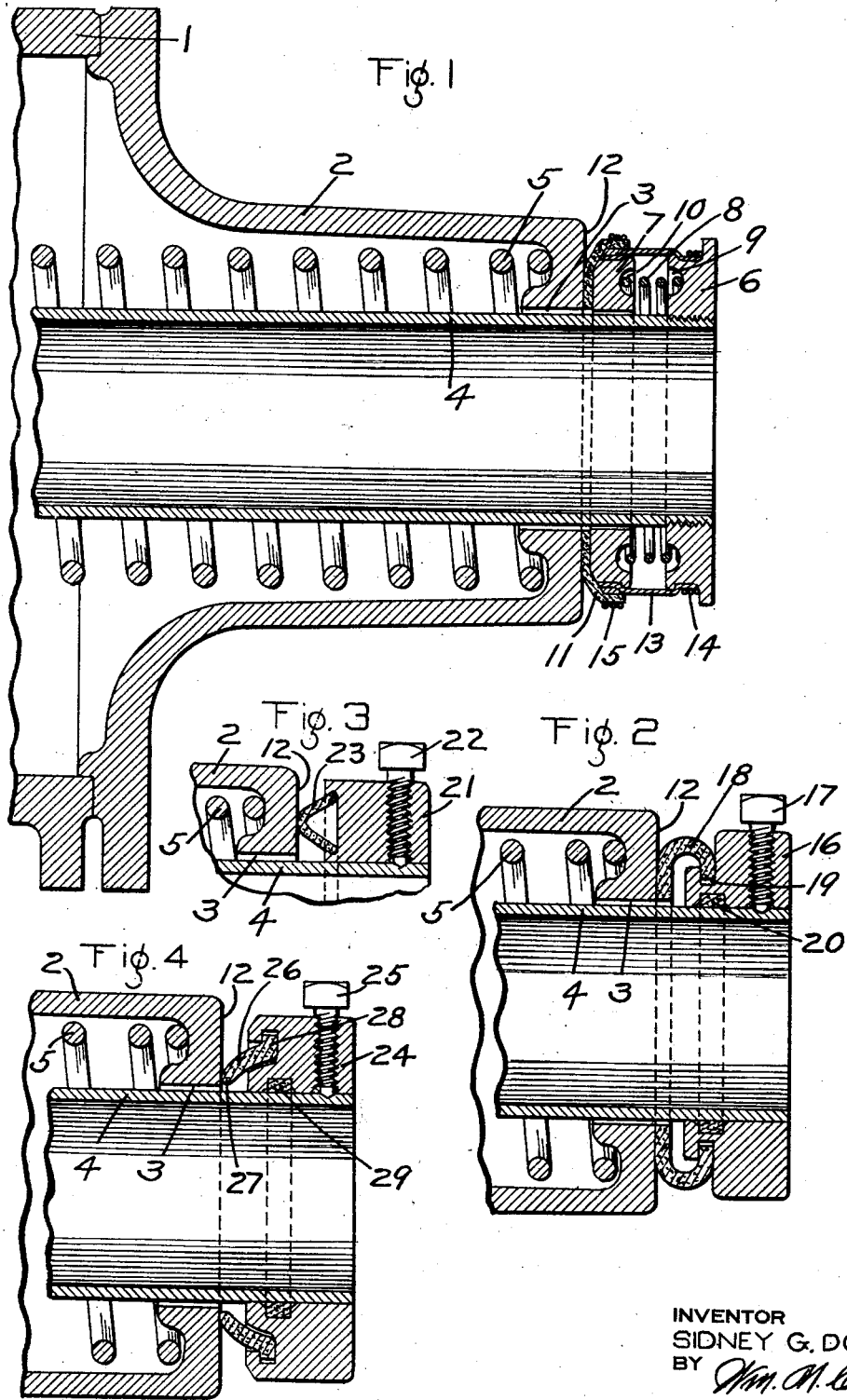

1,887,584

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE CYLINDER DEVICE

Application filed October 16, 1929. Serial No. 399,915.

This invention relates to fluid pressure motor devices, and more particularly to a cylinder and piston construction of the type employed as brake cylinders in fluid pressure brake systems.

With a brake cylinder or similar motor device, a piston rod extends out of the cylinder, through an opening provided in the cylinder head and where there is a clearance space around the piston rod at said opening, as is the case with the usual brake cylinder, dirt, moisture and other foreign matter is liable to enter the cylinder by way of said clearance space.

Dirt entering the cylinder is liable to cause excessive wear of the cylinder walls as well as the piston packing ring and moisture is liable to freeze on the cylinder walls, in cold weather and interfere with the movement of the piston in the cylinder.

One object of my invention is to provide means carried by the piston rod for preventing the entrance of foreign matter around the rod into the cylinder.

Another object of my invention is to provide means carried by the piston rod for preventing the entrance of foreign matter into the cylinder and which is adapted to permit full movement of the cylinder piston to release position, regardless of variations in the distance the piston is required to move to reach the full release position.

In the accompanying drawing; Fig. 1 is a sectional view of the non-pressure head portion of a brake cylinder, showing my improvement applied thereto; Fig. 2 a fragmentary sectional view, showing a modified form of my invention; Fig. 3 a fragmentary sectional view, showing another modified form of my invention; and Fig. 4 a fragmentary sectional view, showing still another modified form of my invention.

As shown in Figure 1, the reference numeral 1 indicates a portion of a brake cylinder to which is secured a non-pressure head 2. Extending out through an opening 3 provided in the non-pressure head is a hollow piston rod 4, which is connected in the usual manner with a piston (not shown) which is adapted to reciprocate in the cylinder 1. The piston is subject to the pressure of a heavy coil spring 5 which urges the piston to its release position in the cylinder.

According to the form of my invention as shown in Figure 1, the dirt excluding device may comprise a collar 6 secured to the outer end of the piston rod 4, as by screw-threaded engagement, and a collar 7 loosely mounted on the piston rod.

A coil spring 8 is interposed between said collars and surrounds the piston rod 4, the ends of the spring being disposed in annular recesses 9 and 10 provided in the respective collars 6 and 7.

Secured to the collar 7 is a cup-shaped ring 11 of felt or other sealing material, which is adapted to engage the end wall 12 of the non-pressure head 2, when the piston rod 4 is in release position. A cylindrical boot 13 of cloth or other flexible material surrounds the collars 6 and 7, so as to exclude dirt and moisture and one end of the boot may be secured to the collar 6 by a banding cord 14. The other end of the boot underlies the horizontal flange portion of the ring 11 and both the ring and this end of the boot may be secured to the collar 7 by means of a banding cord 15.

When the piston rod 4 is in release position, as shown in the drawing, the ring 11 engages the end wall 12 of the non-pressure head 2 and thus prevents the entrance of dirt and moisture into the cylinder 1, by way of the opening 3. Thus the device is operative to prevent the entrance of foreign matter only when the brake cylinder piston is in release position, but this is effective, since the brakes are ordinarily released while the train is running along the track.

The spring 8 permits a yielding movement of the collar 7 and the ring 11, so that the piston rod 4 and the brake cylinder piston (not shown) may make the complete release stroke, regardless of variations in the movement of the piston rod necessary to fully complete the stroke.

According to the modified construction shown in Figure 2, a collar 16 may be secured to the piston rod 4 by means of a set screw 17. A dirt excluding ring 18, which is shown as U-shaped in cross section, is provided, and the collar 16 is provided with an annular recess 19, into which one flange of the ring 18 is adapted to be sprung, so as to hold the ring secured to the collar. The other flange of the ring is adapted to engage the end wall 12 of the non-pressure head, so as to exclude from and prevent the entrance of dirt and moisture into the cylinder.

The collar 16 may be provided with an interior annular recess adapted to receive a packing ring 20, of felt or other sealing material, which ring is adapted to engage the rod 4 and prevent passage of dirt and moisture between the collar 16 and the rod 4 into the cylinder.

The U-shaped cross section of the ring 18 permits the ring to yield, so that the construction provides for variations in the movement of the piston rod 4, necessary to permit the brake cylinder piston to move to full release position.

According to the modified form of my invention, as shown in Figure 3, a collar 21 is secured to the piston rod 4 by means of a set screw 22 and ring 23 of felt or other sealing material is provided, which ring is U-shaped in cross section, the two flanges of the ring being adapted to engage in an under-cut annular recess provided in the collar 21, and the bend of the ring being adapted to engage the end wall 12 of the non-pressure head 2. The ring 23 is sprung into the recess in the collar 21 and is held in place, by the undercut walls of the recess. The ring 23 can flex, so as to permit relative movement of the piston rod 4 and at the same time maintain a tight joint at the wall 12.

According to the construction shown in Figure 4, a collar 24 is secured to the piston rod 4 by means of a set screw 25 and a ring 26 of felt or other sealing material, is provided. The ring 26 is provided with a flange which is curved in cross section and has a rounded end portion 27 adapted to engage the end wall 12 of the non-pressure head 2. The ring also has a radially extending flange 28 which is adapted to be sprung into a radial recess provided in the collar 24.

A packing ring 29 may be disposed in an annular recess formed in the collar 24, so as to engage the piston rod 4, and prevent passage of dirt and moisture between the collar 24 and the rod 4.

While one illustrative embodiment of the invention has been described in detail, it is not my intention to limit its scope to that embodiment or otherwise than by the terms of the appended claims.

Having now described the invention, what is claimed as new and desired to be secured by Letters Patent, is:

1. The combination with a brake cylinder for a fluid pressure brake system having a non-pressure head and a piston rod extending throught an opening in said head, of a member carried by said rod exteriorly of the cylinder and a packing ring secured to said member and adapted to engage the end wall of said non-pressure head to prevent foreign matter from entering said cylinder through said opening.

2. The combination with a brake cylinder for a fluid pressure brake system having a non-pressure head and a piston rod extending through an opening in said head, of a member carried by said rod exteriorly of the cylinder and a packing ring of felt or similar material secured to said member and adapted to engage the end wall of said non-pressure head, to prevent foreign matter from entering said cylinder through said opening.

3. The combination with a brake cylinder for a fluid pressure brake system having a non-pressure head and a piston rod extending through an opening in said head, of a member carried by said rod exteriorly of the cylinder and a packing ring of felt or similar material secured to said member and adapted to engage the end wall of said non-pressure head, when the piston rod is in release position, to prevent foreign matter from entering said cylinder through said opening.

4. The combination with a brake cylinder for a fluid pressure brake system having a non-pressure head and a piston rod extending through an opening in said head, of a collar secured to said rod exteriorly of the cylinder, a collar movable on said rod, a packing ring carried by said movable collar and adapted to engage the end wall of said non-pressure head, and yielding means interposed between said collars.

5. The combination with a brake cylinder for a fluid pressure brake system having a non-pressure head and a piston rod extending through an opening in said head, of a collar secured to said rod exteriorly of said cylinder, a collar movable on said rod adjacent to the other collar, a packing ring carried by said movable collar and adapted to engage the end wall of said non-pressure head, and a spring interposed between said collars.

In testimony whereof I have hereunto set my hand, this 15th day of October, 1929.

SIDNEY G. DOWN.